United States Patent [19]

Calvert et al.

[11] Patent Number: 5,792,301
[45] Date of Patent: Aug. 11, 1998

[54] METHOD FOR HEAT SEALING PAPERBOARD SUBSTRATES USING A UNIFORM ENERGY DISTRIBUTED LIGHT ENERGY BEAM

[75] Inventors: Barry Gene Calvert, Covington; Ralph Scott Peterson, Clifton Forge, both of Va.

[73] Assignee: Westvaco Corporation, New York, N.Y.

[21] Appl. No.: 910,935

[22] Filed: Aug. 8, 1997

Related U.S. Application Data

[62] Division of Ser. No. 612,476, Mar. 7, 1996, Pat. No. 5,690,775.

[51] Int. Cl.$^6$ ................................................. B32B 31/28
[52] U.S. Cl. ........................ 156/272.8; 156/275.3; 156/275.7; 156/324; 372/102; 359/566
[58] Field of Search ........................ 359/566, 571; 372/102; 156/272.8, 275.1, 275.7, 324, 275.3

[56] References Cited

U.S. PATENT DOCUMENTS

| | | |
|---|---|---|
| 3,677,868 | 7/1972 | Boggs . |
| 3,791,856 | 2/1974 | Duling et al. . |
| 3,945,873 | 3/1976 | Osborn . |
| 3,963,820 | 6/1976 | Blakey . |
| 4,029,535 | 6/1977 | Cannon et al. ............ 156/272.8 |
| 4,149,288 | 4/1979 | Sendor et al. . |
| 4,155,647 | 5/1979 | Michel ............ 372/102 |
| 4,291,087 | 9/1981 | Warburton, Jr. . |
| 4,491,383 | 1/1985 | Pera et al. ............ 359/201 |
| 4,540,392 | 9/1985 | Junod et al. . |
| 5,011,709 | 4/1991 | Arbogast et al. . |
| 5,261,904 | 11/1993 | Baker et al. ............ 606/17 |

Primary Examiner—Michael W. Ball
Assistant Examiner—Michael A. Tolin
Attorney, Agent, or Firm—J. R. McDaniel; R. L. Schmalz

[57] ABSTRACT

This invention relates to a method and apparatus for heat sealing polymer coated paperboard substrates with light energy. Such structures of this type, generally, use lasers which allow a very accurate placement of the sealing energy and a controllable energy level.

6 Claims, 3 Drawing Sheets

METHOD FOR HEAT SEALING PAPERBOARD SUBSTRATES USING A UNIFORM ENERGY DISTRIBUTED LIGHT ENERGY BEAM

This application is a division of application Ser. No. 08/612,476, filed Mar. 7, 1996, now a U.S. Pat. No. 5,690,775.

BACKGROUND OF THE INVENTION

1. Field of the Invention

This invention relates to a method and apparatus for heat sealing polymer coated paperboard substrates with light energy. Such structures of this type, generally, use lasers which allow a very accurate placement of the sealing energy and a controllable energy level.

2. Description of the Related Art

It is known that a method and apparatus exists to seal coated paperboard materials using light energy. Exemplary of such prior art is U.S. Pat. No. 4,540,392 ('392) to Junod et al. entitled "Method and Apparatus to Seal Coated Paperboard Materials". While the '392 patent describes the use of light energy to seal polymer coated paperboard materials, this reference employs a laser beam. In particular, the beam as described in the '392 patent has a gaussian energy distribution and is narrowly focused as it traverses the seal area.

With respect to the use of a laser it is well known that to seal effectively using a laser, the laser power cannot exceed a specific energy/area/time. If too much power is used, the polymer will degrade and may even ignite. It should be noted that a $CO_2$ laser (like the one taught in the '392 reference) operating over a wavelength of 10.4 to 11.2 μm can also be used to cut steel. The gaussian energy distribution of such a laser produces a hot spot in the center of the beam. The edges of the beam will have significantly less energy. If the beam power is adjusted to provide good sealing in the center, the seal will be quite narrow. If the power is increased to seal over a wider area, the laser may actually burn the polymer in the center of the beam while creating two parallel sealing strips. Consequently, a more advantageous method and apparatus would be one which produces a uniform energy distribution over the heated polymer surface.

It is apparent from the above that there exists a need in the art for a method and apparatus which is capable of sealing paperboard substrates which light energy, and with at least equals the sealing characteristics of the known processes, but which at the same time produces a uniform energy distribution along the seal.

It is a purpose of this invention to fulfill this and other needs in the art in a manner more apparent to the skilled artisan once given the following disclosure.

SUMMARY OF THE INVENTION

Generally speaking, this invention fulfills these needs by providing an apparatus for heat sealing coated paperboard substrates with light energy, comprising at least two coated paperboard substrates each of the substrates including a paperboard base and a heat sealable polymeric coating located adjacent to the paper-board base, a coated paperboard substrate converging means wherein the at least two coated paperboard substrates are brought substantially adjacent to each other such that the polymeric coatings are brought substantially into an area of contact with each other, a light energy means located at a predetermined distance from the paperboard substrate converging means which produces a first unfocused light energy beam, a light energy beam optical means located substantially in a plane between the light energy means and the paperboard substrate converging means for producing a second uniform light energy beam such that the second uniform light energy beam impinges upon the area of contact between polymeric coatings to substantially soften the polymeric coatings and create a seal between the at least two coated paperboard substrates.

In certain preferred embodiments, the paperboard substrate converging means is a conventional pressure nip. Also, the light energy means is a laser. Finally, the light energy optical means is a diffraction grating or a faceted focusing mirror.

In another further preferred embodiment, the use of the optical means provides a uniform energy distribution for the laser beam as it impinges upon the coated paperboard substrate. Also, the use of the laser to heat the polymeric coatings for sealing allows for a very accurate placement of the sealing energy and a controllable energy level.

The preferred sealing apparatus, according to this invention, offers the following advantages: lightness in weight; ease of assembly and repair; good stability; good durability; excellent heat sealing characteristics; excellent placement of the sealing energy; a controllable energy level; a uniform energy distribution; reduced energy consumption; and excellent economy. In fact, in many of the preferred embodiments, these factors of heat sealing, placement of the sealing energy, a controlled energy level, a uniform energy distribution, a reduced energy consumption, and excellent economy are optimized to the extent that is considerably higher than heretofore achieved in prior, known heating sealing apparatus.

This and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

Figure 1:
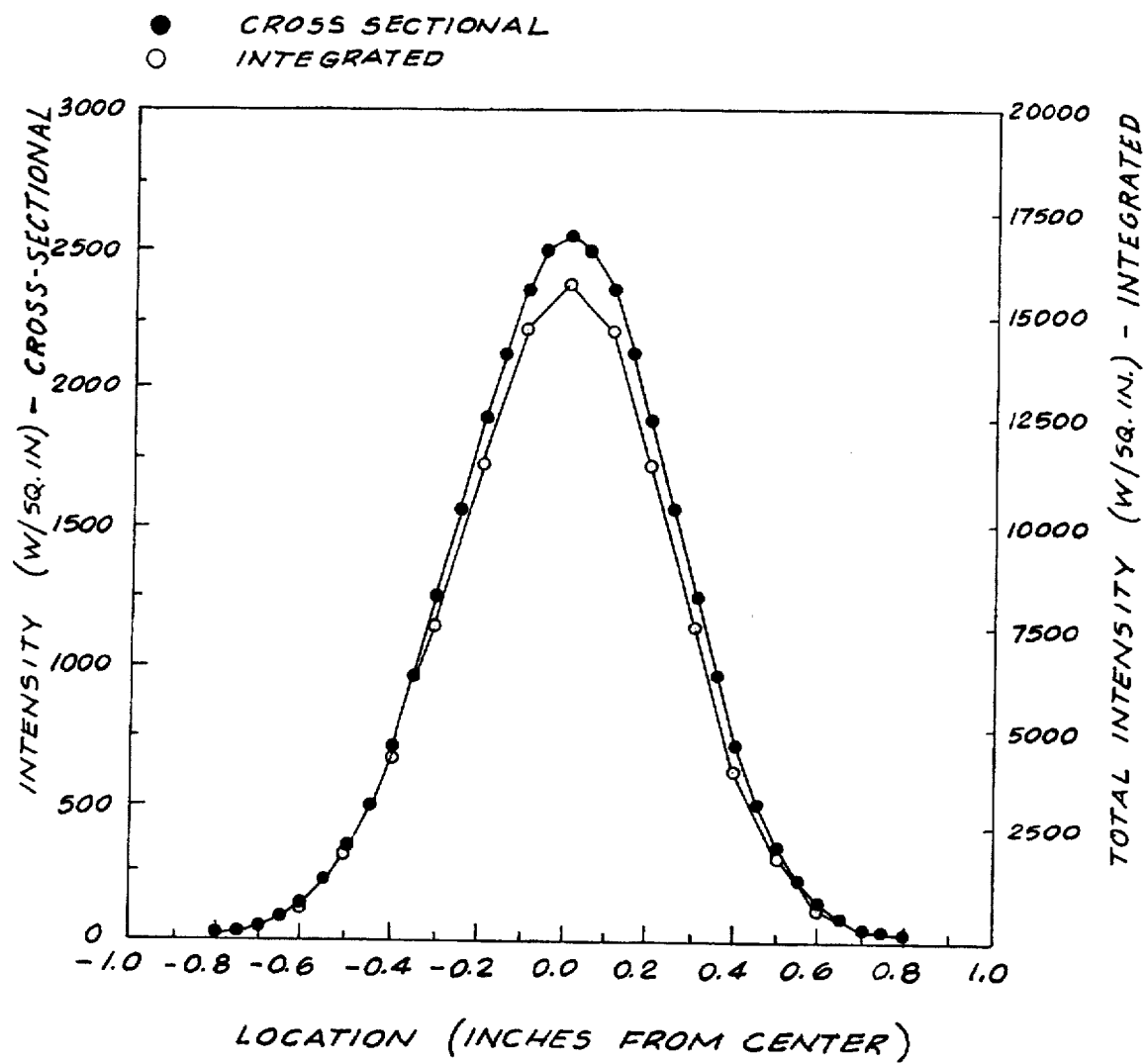
FIG. 1 is a graphical illustration of intensity (in watts per square inch) and total intensity (in watts per square inch) versus location (in inches from the center of the light beam)

FIG. 1 illustrates the profile of a gaussian beam. In particular, a gaussian beam, as created in the '392 patent, has a center which might actually burn the polymer, while the adjacent areas are softened sufficiently to produce a good seal. FIG. 1 shows a cross-sectional energy profile and integrated energy profile for a stationary beam hitting the surface of a moving web. If it is assumed that a seal 0.8 inch across needs to be sealed, then the speed must be adjusted to get a good seal with about 4,400 Watts per square inch of intensity. In the center, the intensity is actually about 16,000 Watts per square inch, which is over three times greater than needed to seal. With uniform energy distribution, as set forth in the present invention, an area over 2.0 inches wide could be sealed with the same laser.

Figure 2:
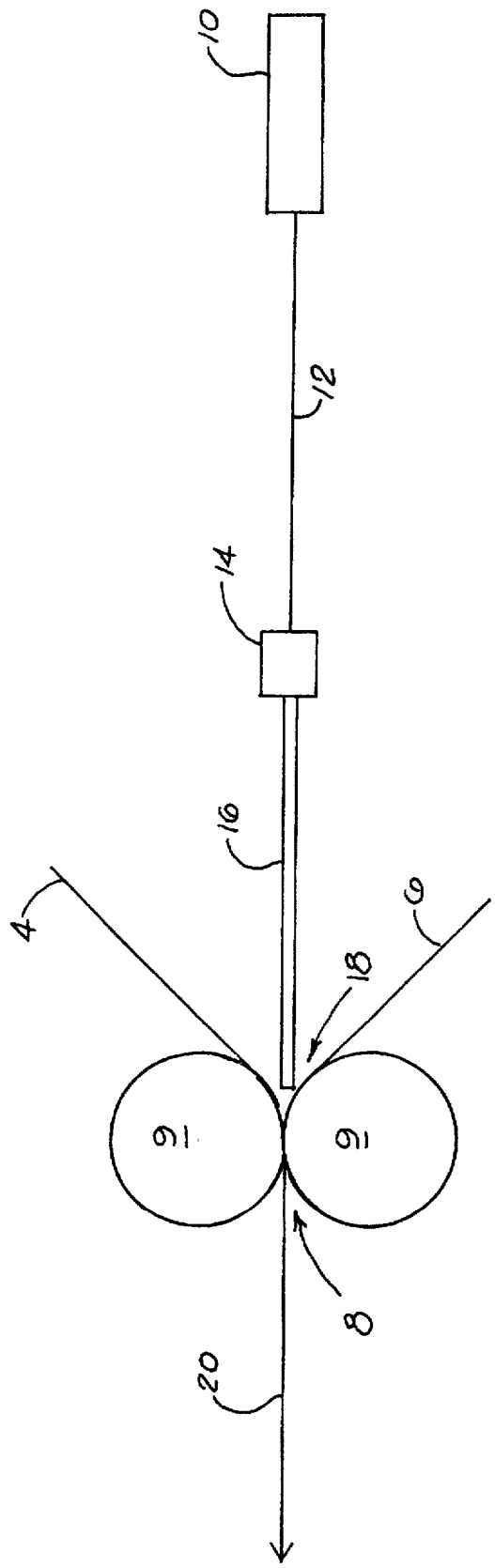
FIG. 2 is a schematic illustration of an apparatus for heat sealing paperboard substrates with light energy, according to the present invention.

With reference to FIG. 2, there is illustrated an advantageous environment for use of the concepts of this invention. In particular, FIG. 2 illustrates heat seal apparatus 2. Apparatus 2 includes, in part, conventional paperboard substrate base 4, conventional paperboard substrate heat sealable polymeric barrier 6, conventional pressure nip 8, conventional rollers 9, laser 10, gaussian energy distributed beam 12, optical means 14, uniform energy distributed beam 16, heat sealing zone 18, and heat sealed paperboard substrate 20.

Laser 10, preferably, is a conventional carbon dioxide ($CO_2$) laser having approximately 1700 watts of power. Optical means 14, preferably, can be either a diffraction grating or a copper, cylindrical, faceted focusing mirror which is capable of producing a uniform beam approximately 0.015 inch wide by 0.5 inch long.

During the operation of apparatus 2, paperboard base 4 and polymer barrier 6 are bought into contact at pressure nip 8 by rollers 9. Gaussian energy distributed laser beam 12 from laser 10 is positioned to pass through diffraction grating 14. Diffraction grating 14 transforms the gaussian energy distribution of beam 12 into a uniform energy distributed laser beam 16.

Figure 3:
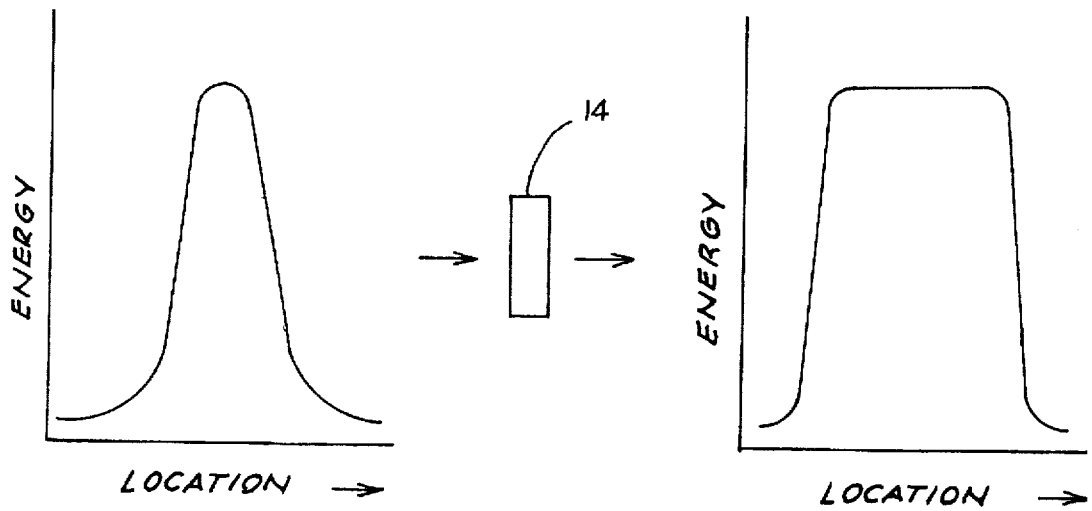
FIG. 3 is a schematic illustration of the transformation of a gaussian energy distributed beam to a uniform energy distributed beam, according to the present invention.

As can be seen more clearly in FIG. 3, the gaussian energy distribution of a laser beam has a more rounded appearance and thus may produce a hot spot in the center of the beam. Also the edges of the beam will have significantly less energy. After the beam has impinged upon diffraction grating 14, a beam with a uniform energy distribution can be observed. In particular, the hot spot in the center has been expanded and the edges of the beam will have significantly more energy. Thus, the use of the uniform energy distribution will produce seals with greater integrity and also provide a wider window of operation.

Figure 4:
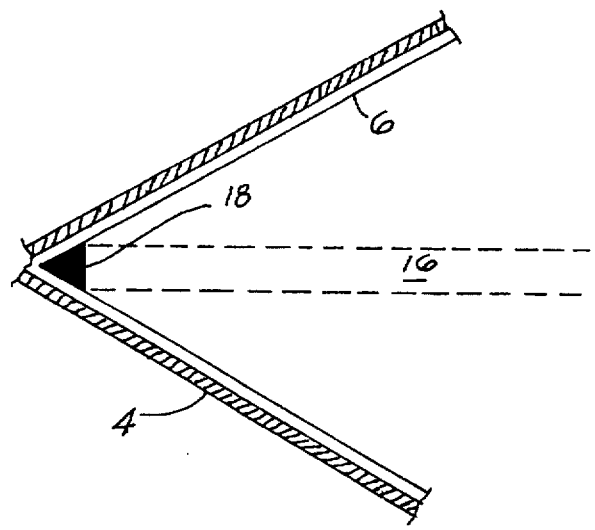
FIG. 4 is a schematic illustration of the light energy beam impinging upon the sealing zone in order to seal the paperboard substrates, according to the present invention.

Finally, with respect to FIG. 4, there is more clearly illustrated heat sealing zone 18. In particular, FIG. 4 illustrates that uniform energy distributed laser beam 16 impinges upon sealing zone 18 in order to soften polymeric barrier 6 which is located upon paperboard substrate base 4. As base 4 and barrier 6 are drawn through pressure nip 8, uniform energy distributed laser beam 16 creates a heat sealing zone 18 which allows base 4 and barrier 6 to form heat sealed substrate 20 (FIG. 2). It is to be understood that apparatus 2 could-be employed to heat seal side seams of paperboard substrates. If a side seam is to be heat sealed, conventional converging guide plates may be used instead of rollers 9.

It is to be understood that the beam 16 must be applied immediately prior to the pressure nip 8 because beam 16 only heats the surface of the sealing zone 18. The energy per area per time (energy/area/time) can be adjusted so the sealing barriers soften sufficiently to produce a seal. It is possible to adjust variables such as the traveling speed of the paperboard base 4 and barrier 6, the angles of convergence at the sealing zone 18, the width of beam 16, and the energy of beam 16 to achieve an optimum seal. While a $CO_2$ laser would be appropriate for most barriers, it is to be understood that other types of lasers may be appropriate. Also, it is to be understood that the laser wavelength should be in the region absorbed by the sealing barrier 6 for the most efficient operation.

It is also to be understood that the use of a uniform energy distribution could allow the implementation of a smaller, less expensive laser to produce a more cost effective process. For example, a $CO_2$ laser with 1,700 watts of power costs over $100,000 and a 6,000 watt model costs almost $500,000. The higher wattage model is also more expensive to operate.

As further proof of the present invention's cost effectiveness, during tests of the present invention, a power of 2 to 8 (Watts per feet per minute) W/fpm produced acceptable seals. Integration of the beam to create a uniform energy distributed beam should reduce the energy required by approximately 50%. Therefore, a 1,700 Watt laser should seal substrates moving at about 200–850 fpm. This more efficient use of the laser energy would greatly reduce the capital and operating expenses.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method for heat sealing at least two coated paperboard substrates, wherein said method is comprised of the steps of:

coating at least two paperboard substrate bases with a heat sealable polymeric coating;

converging said coated paperboard substrates with a converging means such that said polymeric coatings on each of said at least two coated paperboard substrates are brought into contact with each other to form a sealing zone;

emitting a gaussian energy distributed light energy beam from a light energy beam producing means;

impinging said gaussian beam upon a light energy beam optical means to produce a uniform energy distributed light energy beam, wherein said light energy beam optical means is further comprised of: a copper, cylindrical, faceted focusing mirror; and impinging said uniform beam onto said sealing zone to soften said polymeric coatings and create a seal between said coated paperboard substrates.

2. The method, as in claim 1, wherein said converging means is further comprised of:

at least two rollers having a pressure nip located substantially between said rollers.

3. The method, as in claim 1, wherein said light energy means is further comprised of:

a laser.

4. The method, as in claim 3, wherein said laser is further comprised of:

a $CO_2$ laser.

5. The method, as in claim 4, wherein said $CO_2$ laser has a power rating of 1700 Watts.

6. The method, as in claim 1, wherein said light energy beam optical means is further comprised of:

a diffraction grating.

* * * * *